United States Patent [19]

Herman et al.

[11] Patent Number: 4,859,844
[45] Date of Patent: Aug. 22, 1989

[54] COMB FILTER PRESSURE/TEMPERATURE SENSING SYSTEM

[75] Inventors: Elvin E. Herman, Pacific Palisades; Bart E. Likes, Northridge, both of Calif.

[73] Assignee: Hughes Aircraft Company, Los Angeles, Calif.

[21] Appl. No.: 159,816

[22] Filed: Feb. 24, 1988

[51] Int. Cl.⁴ ............................................. G01D 5/34
[52] U.S. Cl. ............................... 250/231 P; 250/226; 250/227; 356/345
[58] Field of Search ................... 250/226, 227, 231 P, 250/237 G; 356/73, 345, 357, 388; 73/705

[56] References Cited

U.S. PATENT DOCUMENTS

| 3,668,405 | 6/1972 | Brooks et al. | 250/550 |
| 4,408,123 | 10/1983 | Sichling et al. | 250/226 |
| 4,446,366 | 5/1984 | Brogardh et al. | 250/227 |
| 4,571,080 | 2/1986 | Papuchon et al. | 356/345 |
| 4,668,093 | 5/1987 | Cahill | 356/345 |
| 4,767,210 | 8/1988 | Koshyap | 356/345 |
| 4,778,988 | 10/1988 | Henderson | 250/226 |

Primary Examiner—David C. Nelms
Assistant Examiner—Stephone B. Allen
Attorney, Agent, or Firm—Leonard A. Alkov

[57] ABSTRACT

A sensing system having a wideband optical source for providing optical illumination having a bandwidth of at least 25 nanometers, and an optical fiber cable for transmitting the optical illumination to a remote location. A transducer responsive to the transmitted optical illumination amplitude modulates the transmitted optical illumination as a function of a monitored physical parameter (for example, pressure or temperature) to provide an amplitude modulated optical illumination having generally sinusoidally varying nulls across the spectrum thereof, the frequency of the nulls varying across the spectrum of the modulated optical illumination and being a function of the monitored physical parameter. The fiber optic cable (or another fiber optic cable, depending on the transducer implementation) transmits the modulated optical illumination to an optical spectral analyzer which provides a spectrally dispersed optical signal indicative of the spectral content and amplitudes of the modulated optical illumination. A clocked detector array responsive to the spectrally dispersed optical signal is clocked at a varying clock rate to remove the frequency variation of the periodic nulls across the optical spectrum, so as to provide an electrical signal having a substantially constant frequency of the nulls. Narrowband filtering circuitry filters the electrical signal of substantially constant frequency to provide a filtered signal, and output circuitry responsive to the filtered signal provides an output signal indicative to the substantially constant frequency of the periodic nulls.

16 Claims, 4 Drawing Sheets

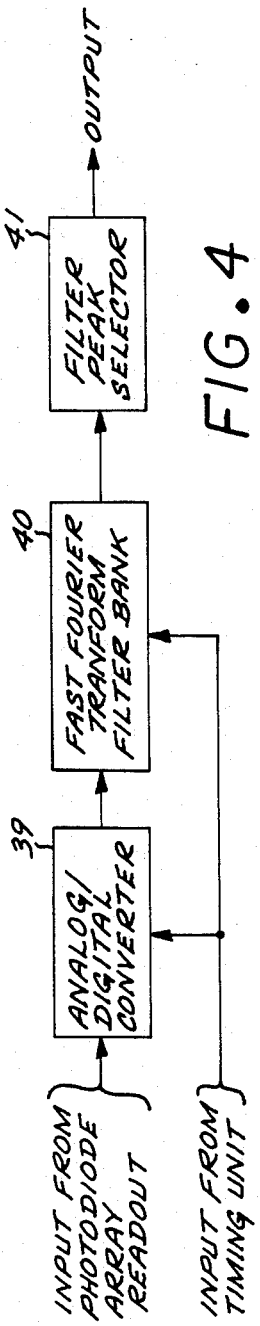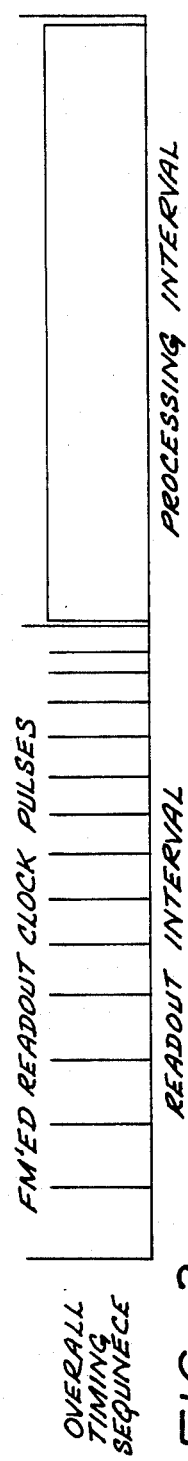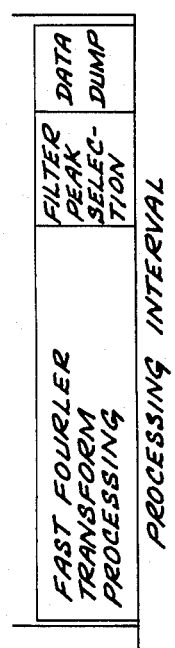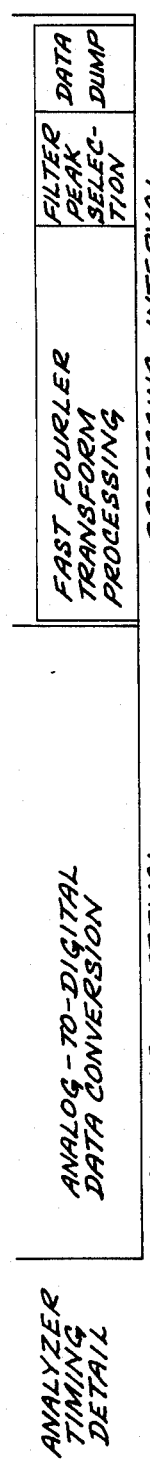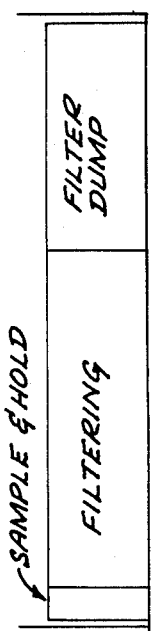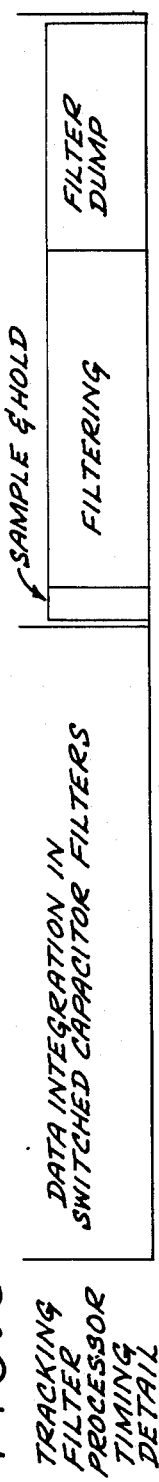

COMB FILTER PRESSURE/TEMPERATURE SENSING SYSTEM

BACKGROUND OF THE INVENTION

The disclosed invention generally relates to sensing systems, and is more particularly directed to a sensing system having passive elements in its transducer.

Sensing systems may be utilized in applications where one or more parameters (e.g., pressure or temperature) is sensed at a location that is remote from the readout device. For example, pressure and temperature sensing systems are utilized in oil and gas wells to provide pressure and temperature information, sometimes sensed at the well-head and/or down-hole. Such sensing systems may be utilized to optimize production efficiency, and to determine operating parameters that are useful in assessing the well's performance status.

Known pressure and/or pressure sensing systems, such as those used in oil wells, typically include active devices (e.g., transistors) in the transducer and its associated components. In oil well applications, the transducer (i.e., the sensing element for sensing pressure or temperature) is sometimes located down-hole, and is therefore subjected to a very harsh environment. Downhole transducers that utilize active devices generally have limited lifetimes due to the harsh environment, and moreover are very difficult and costly to replace. As a result, they typically do not get replaced, and the oil wells are operated without the benefit of pressure and temperature information.

A further consideration with known sensing systems that utilize active devices in their transducers and which are utilized in a harsh environment is drift. Such consideration is particularly important in applications such as oil wells where access to the transducers is difficult and costly after installation.

A further consideration with known pressure or temperature sensing systems having transducers that utilize active devices is the necessity of providing power to the active devices. In the case where the transducer is placed down down-hole, the power must be supplied down-hole, thus posing another possible failure mode through breakage of the power-supplying electrical conductors, or poor contacts in their electrical connectors.

SUMMARY OF THE INVENTION

It would therefore be an advantage to provide a pressure or temperature sensing system which functions reliably for extended lifetimes in a harsh environment.

Another advantage would be to provide a pressure or temperature sensing system which provides for long term accuracy.

It would also be an advantage to provide a pressure or temperature sensing system that utilizes only passive devices in its transducer, and which does not require electrical power for operation of the sensing element in the transducer, or for relay of sensed data from the transducer.

The foregoing and other advantages are provided by a sensing system which includes a wideband optical source for providing optical illumination having a bandwidth of at least 25 nanometers, and an optical fiber cable for transmitting the optical illumination to a remote location. A transducer responsive to the transmitted optical illumination amplitude modulates the transmitted optical illumination as a function of a monitored physical parameter to provide an amplitude modulated optical illumination having generally sinusoidally varying nulls across the spectrum thereof, the frequency of the nulls varying across the spectrum of the modulated optical illumination and being a function of the monitored physical parameter. The fiber optic cable (or another fiber optic cable, depending on the transducer implementation) transmits the modulated optical illumination to an optical spectral analyzer which provides a spectrally dispersed optical signal indicative of the spectral content and amplitudes of the modulated optical illumination. A clocked detector array responsive to the spectrally dispersed optical signal is clocked at a varying clock rate to remove the frequency variation of the periodic nulls across the optical spectrum, so as to provide an electrical signal having a substantially constant frequency of the nulls. Narrowband filtering circuitry filters the electrical signal of substantially constant frequency to provide filtered signal, and output circuitry responsive to the filtered signal provides an output signal indicative to the substantially constant frequency of the periodic nulls.

BRIEF DESCRIPTION OF THE DRAWING

The advantages and features of the disclosed invention will readily be appreciated by persons skilled in the art from the following detailed description when read in conjunction with the drawing wherein.

DETAILED DESCRIPTION

Figure 1:
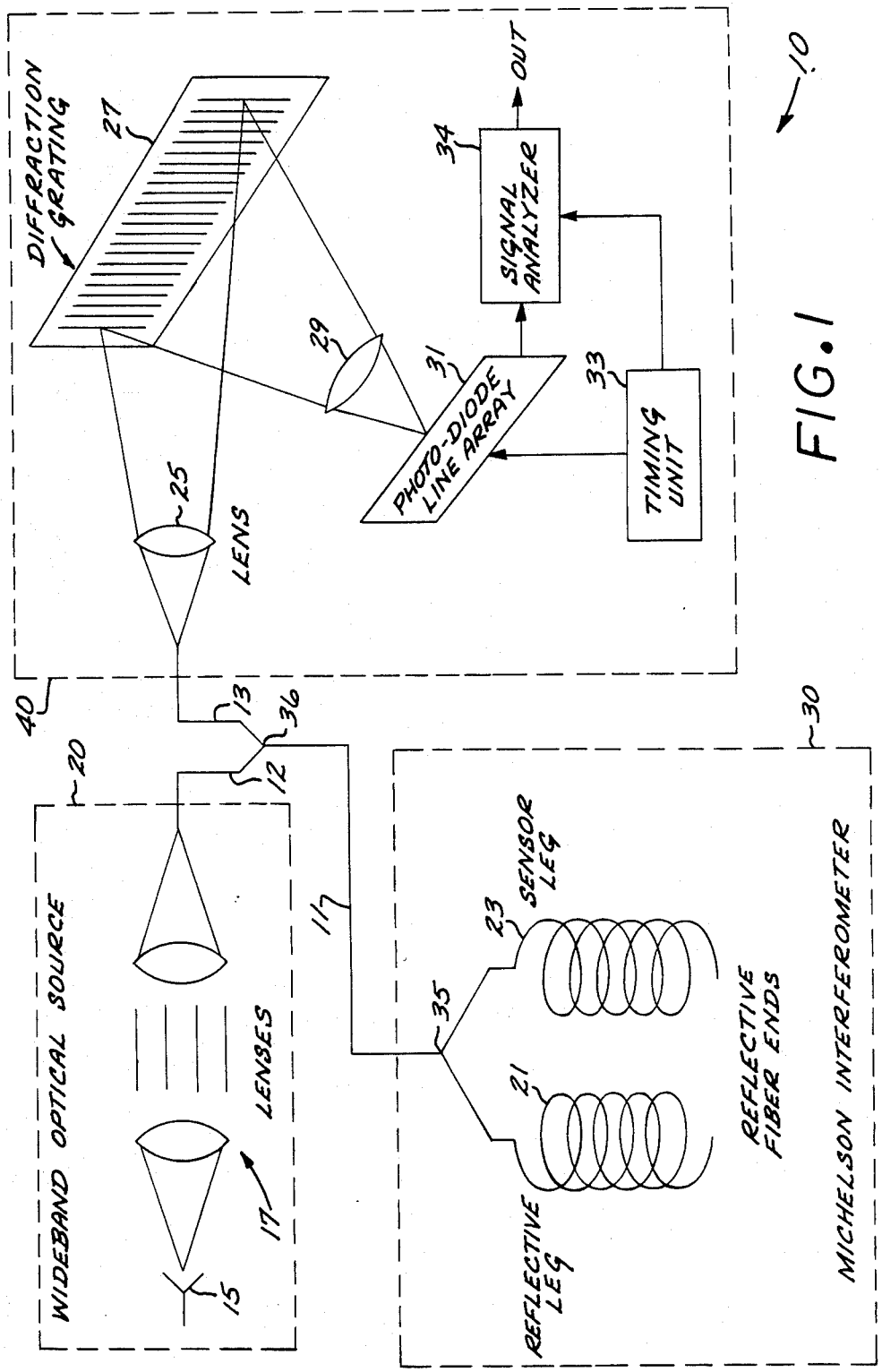
FIG. 1 is a block diagram of a pressure sensing system implemented with a Michelson interferometer.

In the following detailed description and in the several figures of the drawing, like elements are identified with like reference numerals.

Referring now to FIG. 1, shown therein is a pressure transducing system 10 in accordance with the invention and which includes a wideband optical module 20 for providing point source illumination for a fiber optic cable 11. By way of example, the wideband optical module 20 can provide illumination having infrared (IR) wavelengths, near IR wavelengths, or visible light wavelengths. The fiber optic cable 11 is coupled to a transducer 30 which amplitude modulates the source illumination provided by the fiber optic cable 11 by placing periodic nulls across the spectrum thereof. The modulated illumination is provided to an analyzer 40 via the fiber optic cable 11 and the fiber optic cable 13.

By way of example, in an oil well application the wideband optical module 20 might be located at the wellhead, or in the case of sub-sea wells at a shore-based station, or at a sub-sea flow control assembly at the well-head. The transducer 30 would be positioned downhole in the oil well, while the optical analyzer 40 would, for example, be surface-based, such as at a monitoring station or at a well control station.

The wideband optical module 20 includes a wideband optical source 15, which by way of example may be one or more high brightness wideband light emitting diodes (LED's). A collimating and focusing lens system 17 optically couples the output of the wideband optical source 15 to the fiber optic cable 11 via an optical fiber 12 and a three-port optical splitter/combiner 36. Alternatively, the output of the wideband optical source (or sources) is directly coupled to the optical fiber 12.

The wideband optical source 15 should provide a bandwidth commensurate with the requirements for the pressure range and accuracy of the transducer 30. By way of example, such bandwidth may be 20 to 80 nanometers with the center of the bandwidth being at, for example, 850 nanometers; i.e., an IR optical source having a bandwidth of about 2 to 10 percent.

As an alternative to a single wideband optical source such as an LED, the wideband optical source 15 can include a plurality of optical sources, such as LED's, which may be combined to increase the total optical power and/or to cover respective portions of the desired optical spectrum. The outputs of such optical sources would be combined, for example, with fiber optic combiners.

A further alternative for implementation of the wideband optical source 15 would be a laser diode that is capable of being swept over the required wavelength range. The use of such a wavelength-swept source requires either that the source be capable of covering the bandwidth of interest without wavelength gaps, or its modes must be spaced considerably closer in the wavelength domain than the minimum spacing of the periodic interferometeric nulls created by the interferometer in the transducer 30.

Figure 2:
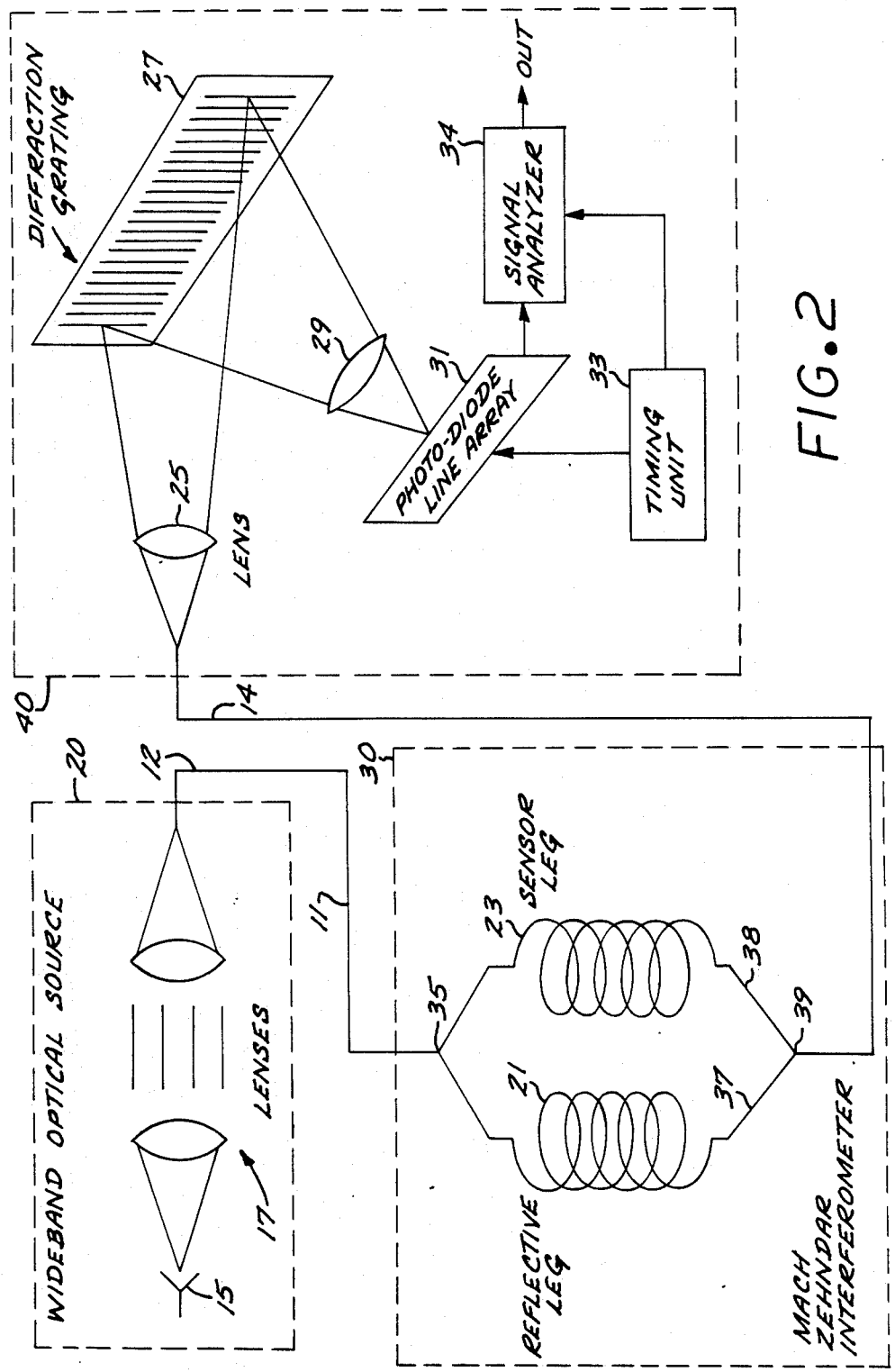
FIG. 2 is a block diagram of a pressure sensing system as alternatively implemented with a Mach Zehndar interferometer.

As discussed more fully herein, the transducer 30 is implemented with one of several types of interferometers that are capable of creating amplitude modulation in the form of periodic peaks and nulls across the illumination spectrum provided by the optical source 15, where the periodic peaks and nulls are approximately sinusoidal in shape. One such type is a Michelson interferometer as shown in FIG. 1; another is a Mach Zehndar interferometer as shown in FIG. 2.

As another alternative optical source, an incandescent infrared source can be utilized as the wideband optical source 15, provided that sufficient light can be coupled into the fiber optic cable 11.

In the example embodiment shown in FIG. 1, the transducer 30 includes a Michelson interferometer which more particularly includes first and second optical legs 21, 23 comprising respective optical fiber channels that are optically coupled via a three-port optical splitter/combiner 35 to receive the illumination provided by the fiber optic cable 11 which receives the source illumination via the three-port optical splitter/combiner 36.

The three-port optical splitter/combiner 36 allows light to pass from the wideband source down the fiber optic cable 11 to the down-hole transducer 30 while permitting light returning from the down-hole transducer 30 to be extracted into another optical fiber channel 13. Such an optical splitter/combiner is known in the art and provides negligble internal cross-coupling between its input from the LED source and the output optical fiber that extracts the return light from the interferometer.

The three-port optical splitter/combiner 35 functions similarly to the optical splitter/combiner 36.

The first optical leg 21 of the interferometer is a reference leg which does not change significantly in length with change in the pressure being sensed, while the second optical leg 23 is a sensor leg which changes in length with change in the pressure being sensed. The ends of the optical fibers comprising the first and second optical legs 21, 23 are made highly reflective so that the light in each leg of the interferometer is returned along the legs and combined in the three-port optical splitter/combiner 35 so that the now combined reflected light returns via the fiber optic cable 11. The combined output illumination from the Michelson interferometer, after having been amplitude modulated across its spectrum by the action of the interferometer, is provided to the analyzer 40 via the three-port optical splitter/combiner 36.

As an alternative to the Michelson interferometer shown in FIG. 1, a Mach Zehndar interferometer can be used as shown in FIG. 2. In such embodiment, the illumination transmitted by the two legs 37, 38 of the interferometer is combined in a three-port optical splitter/combiner 39 for transmission to the analyzer 40 via a return fiber optic cable 14.

Referring again to the Michelson interferometer implementation of FIG. 1, the first and second optical legs 21, 23 can comprise, for example, respective single mode optical fibers. The optical fiber of the reference leg 21 is wound in a coil or otherwise configured in the transducer 30 so that its length does not change significantly with pressure. The optical fiber of the sensing leg 23 is wound, for example, on an expansible cylinder, and configured in such a way that the diameter of the cylinder increases by a small amount in proportion to pressure, thereby increasing the length of the sensor leg 23. An alternative to winding the reference and/or sensing optical fiber on a cylinder is to configure the interferometer so that the sensing optical fiber is linearly stretched pursuant to pressure such as with a bellows structure whose length varies with pressure. The optical fiber of the pressure sensing leg 23 might, for example, be made longer than the optical fiber of the reference leg 21, whereby when pressure is increased, the length of the sensing leg 23 increases even more with respect to the reference leg 21. By way of more specific example, the differential length at the minimum atmospheric pressure to be encountered might be 0.01 inches when not subject to down-hole well pressure. Under maximum pressure, the differential length might increase to 0.11 inches.

Apart from the slightly longer length in the sensing leg 23, the optical legs 21, 23 have relatively long equal lengths. The relatively long length in the sensing leg 23 provides for an easily sensed amount of elongation as a function of pressure without incurring permanent fiber deformation or breakage. The sensing leg 23 is made of nearly equal but slightly longer length than the reference leg, so that the two legs never become equal at any pressure within the range to be sensed. However, at maximum pressure (maximum differential lengths in the interferometer legs), the periodic nulls across the spectrum must not be too closely spaced to be resolved in the analyzer 40. At the same time, the number of nulls at maximum pressure must be sufficiently large that the change in null spacing can be discriminated with sufficient accuracy to provide the required pressure accuracy.

As an example of lengths for the two optical legs 21, 23, of the Michelson interferometer shown in FIG. 1, the reference leg might have a length of 100 inches, while at nominal atmospheric pressure the sensing leg might have a length 0.01 inches longer (i.e., 100.01 inches). At maximum pressure to be sensed, the sensing leg 23 might increase in length by an additional 0.1 inches (to 100.11). Thus, 0.01 inches of differential length might correspond to nominal atmospheric pressure, while 0.11 inches of differential length might correspond to 5000 pounds pressure. Since the illumination is reflected back along both legs 21, 23 of the Michelson interferometer, the effective differential length between the two legs and the effective change in differential length with pressure is doubled.

The Michelson interferometer of FIG. 1 can be alternatively implemented with optical paths in air instead of optical paths in optical fibers. With such implementation, the physical parameter being monitored (e.g., pressure) would affect one optical path in air instead of elongating an optical fiber. Such an alternative implementation might include an optical splitter for splitting the optical illumination provided by the fiber optic cable 11 into two optical channels. One channel would comprise the reference channel which has a substantially constant optical path. The other channel would comprise the sensing channel and could include a first lens system to collimate the optical illumination received by such channel and a movable mirror to reflect the collimated optical illumination. The reference channel of the interferometer can comprise an optical fiber having a highly reflective end, with a length to provide an optical path that is slightly shorter than the optical path of the sensing leg. The movable mirror in the sensing leg of the interferometer is adapted to vary its distance from the source of the illumination for sensing channel as a function of the physical parameter being monitored. The combined light returned from the interferometer is then provided to the analyzer 40 via the fiber optic cable 11 and the three-port optical splitter/combiner 35.

For ease of later understanding, it should be pointed out that the differential length between the reference leg 21 and the sensing leg 23 of the Michelson interferometer shown in FIG. 1 creates periodic generally sinusoidally varying interferometric nulls across the spectrum of the combined illumination relayed by the fiber optic cable 11 to the analyzer 40. Similarly, the differential length between the legs 37, 38 in the Mach Zehndar interferometer shown in FIG. 2 creates generally sinusoidally varying periodic nulls across the spectrum of the combined illumination relayed by the fiber optic cable 14 to the analyzer 40.

The spacings of the periodic nulls across the spectrum created by the action of the interferometer is determined by the differential length between the two legs of the interferometer and the wavelength, and is thus a direct measure of pressure. However, as will be discussed in the paragraphs to follow, the cycle-to-cycle spacing of these interferometric nulls across the spectrum as imaged onto a photodiode array 31 is not uniform; instead they vary inversely with wavelength across the wideband spectrum provided by the wideband optical source 20. That frequency-varying component must be removed from the photodiode serial readout before narrowband filtering the data to improve the signal-to-noise ratio and to more precisely determine the frequency of the periodic nulls. Once this frequency-varying chirp-like component has been removed, the analyzer 40 functions to determine the frequency of the constant-frequency burst, thereby providing a direct indication of the pressure sensed by the sensing leg of the interferometer (leg 23 of the Michelson interferometer in FIG. 1 and leg 38 of the Mach Zehndar interferometer in FIG. 2).

More particularly, the analyzer 40 (FIGS. 1 and 2) performs three overall functions: (a) it optically spectrally analyzes the optical output of the interferometer and images the resulting spectrum onto a photodiode line array; (b) it converts the optical spectral analysis into an electrical signal by serially reading out the photodiode array with a frequency-varying readout clock rate (the action of the frequency-varying clock rate is to provide a serial output from the photodiode array that is essentially a constant-frequency burst); and (c) it performs narrowband filtering and frequency determination of the serial readout from the photodiode array 31. The narrowband filtering achieves a significant improvement in signal-to-noise ratio. On the basis of the electrical spectral analysis of the readout data, an output is provided that is a direct measure of frequency of the readout burst, i.e., a direct measure of sensed pressure.

In a preferred embodiment of the analyzer 40, the frequency determination of the electrical signal read out from the optical detector array is performed by spectral analyses in a Fast Fourier Transform processor which, in effect, provides a bank of closely and contiguously spaced filters whose outputs are sampled at the end of each essentially constant frequency readout burst from the optical detector array which can be a photodiode line array or a charge coupled device (CCD) line array. Interpolation between the relative magnitudes of the filter outputs can be performed to improve the resolution of the system over that provided directly by the number of filter channels.

The analyzer 40 includes a collimating lens 25 which collimates the illumination provided by the transducer 30. Particularly, in the Michelson interferometer embodiment of FIG. 1, such illumination is provided to the analyzer 40 by the optical fiber 13 which is coupled to the three-port optical splitter/combiner 36, while in the Mach Zehndar interferometer embodiment of FIG. 2, such illumination is provided to the analyzer 40 by the fiber optic cable 14.

The collimated illumination provided by the collimating lens 25 illuminates a diffraction grating 27, which in its simplest form includes rulings that are equally spaced at, for example 1200 lines per millimeter. The diffracted spectrally dispersed illumination outputted from the diffraction grating 27 is focused by a lens system 29 onto a detector line array 31 which by way of example may be a photodiode line array or a CCD line array.

The differential length introduced between the two legs of the interferometer creates periodic peaks and nulls across the spectrum of the wideband optical source, and such nulls are imaged across the photodiode array 31 by virtue of the spectral analysis action of the diffraction grating 27. However, these periodic nulls are not exactly equally spaced across the spectrum of the wideband source. As a result, if no correction were made, the data as serially read out from the photodiode array would contain a chirp-like (time varying) frequency component. This chirp-like component must be removed prior to narrow-band filtering.

The existence of the non-linear spacing of the nulls across the spectrum of the wideband optical source 20 can be shown by the following expression for the relative phase Fe between the two legs of the interferometer, where Delta is the differential length between the two legs of the interferometer and lambda is optical wavelength. It should be appreciated that in the case of the Michelson interferometer (FIG. 1), Delta is the two-way differential length since the illumination is reflected back along the two legs of the interferometer.

That relative phase (i.e., the optical phase angle Fe between the light vectors in the two legs of the interferometer) is shown by the expression below.

$$Fe = \frac{2\, Pi\, Delta}{lambda}$$

From the above expression, it is evident that the relative phase Fe does not vary in direct proportion to optical wavelength lambda. Since the angular spread of the optical spectrum as imaged onto the photodiode array is relatively small (less than 6 degrees in a typical system), the deflection across the photodiode array 31 resulting from the action of the diffraction grating is approximately proportional to the wavelength lambda. But, as shown in the expression above, the phase of the interferometric null Fe varies as 1/lambda. Thus, the phase of the interferometric nulls varies approximately as the reciprocal of the deflection distance along the photodiode array.

It can be shown that this hyperbolic spacing of the nulls corresponds approximately to the change in period of a waveform having a linear (chirp-like) frequency component. This varying frequency component can be removed from the serial data electrically outputted from the photodiode array by varying the readout clocking rate at a corresponding linearly varying rate. Qualitatively, when the interferometric nulls that are close together are read out, the clocking rate is made slow, and correspondingly, when the interferometric nulls that are more widely spaced are read out, the clocking rate is made more rapid. The end result of such non-linear clocking of the photodiode array readout is that the data as read out from the photodiode array is essentially a constant-frequency burst; i.e., it is essentially de-chirped. The frequency of that burst is proportional to the differential length of the interferometer, i.e., the frequency of the burst (as read out with a linearly varying frequency clocking frequency) is essentially proportional to pressure.

Following the removal of the frequency varying (chirp-like) characteristic from the data readout from the photodiode array 31, the de-chirped readout data is electronically processed in a signal analyzer 34. As discussed in greater detail further herein, such signal analysis includes narrowband filtering the de-chirped readout data, followed by further electrical processing to determine the frequency of the interferometric nulls created by the differential length in the interferometer legs.

The timing functions for the analyzer 40 are provided by a timing unit 33 identified in FIGS. 1 and 2. The timing unit 33 provides a clocking signal for the readout of the photodiode line array 31. Such clocking signal has a linearly modulated (FM'd) clock rate (i.e., a clock rate having a linearly varying frequency) to achieve the de-chirping function discussed above relative to the readout of the photodiode line array 31. As discussed more fully below, the timing unit 33 further functions to time functions in the signal analyzer 34.

The overall timing sequence for the analyzer 40 is shown in FIG. 3, and includes a photodiode readout interval, followed by a processing interval. FIG. 3 schematically shows the FM'ed readout clock pulses discussed above relative to de-chirping. More specific aspects of the timing sequence will depend upon the implementation of the signal analyzer 34 which will now be discussed in more detail.

Referring now to FIG. 4, shown therein is a block diagram of one embodiment of the signal analyzer 34. The signal analyzer includes an analog-to-digital converter, a Fast Fourier Transform filter bank, and a filter peak selector, which together perform the signal narrow-banding and frequency determination functions.

More specifically, the de-chirped data read out from the photodiode line array 31 is provided to an analog-to-digital converter 39 which provides digitized data to a Fast Fourier Transform filter bank 40. The filters comprising the Fast Fourier Transform filter bank 40 partially overlap one another in the frequency domain (for example, at the −3 dB points) and cover the frequency interval that corresponds to the pressure extremes to be encountered. Depending upon the pressure, the de-chirped burst (essentially constant frequency) as read out from the photodiode line array 31 will fall within the response of one (or possibly two) of the filters comprising the Fast Fourier Transform filter bank 40.

The Fast Fourier Transform filter bank provides two important functions; namely, narrowband filtering of the data and providing an output indicative of the frequency of the de-chirped data burst as read out from the photodiode line array 31. Such frequency, after de-chirping, is proportional to the sensed pressure.

Since the readout from the photodiode line array 31 is essentially a constant frequency burst by virtue of the non-linear read out clocking, the resulting serial data burst as read out from the photodiode line array 31 has a spectral width determined by the reciprocal of the data burst duration, and a frequency determined by the sensed pressure.

The narrowband filtering provides for greatly improved signal-to-noise ratio than with other techniques for determining frequency of the data burst, such as, for example, cycle counting. The Fast Fourier Transform filter bank 40 performs this narrowband filtering in a bank of narrowband filters. Depending upon the frequency of the data burst, the signal is integrated in one of the filters, or possibly in two of the filters if the data burst frequency falls between the peak frequency responses of two spectrally adjacent filters. However, the wideband noise components that would otherwise compete with the desired signal are reduced to only those noise frequency components falling within the passband of the one or two filters containing the de-chirped data as readout from the photodiode line array 31.

If the sensed pressure is such that the de-chirped readout signal falls, for example, at the peak response frequency of one of the narrowband filters of the Fast Fourier Transform transfilter bank 40, then the data burst signal in that filter competes only with the noise falling within such filter's passband.

An example of one of the wideband electrical noise contributors that is significantly reduced by the narrowband filtering process is the random noise produced by dark current in the photodiode line array 31. A further example of wideband noise that is significantly reduced is the noise generated in the amplifier (not specifically shown) that would normally be used following the photodiode array line array 31. Still another example of a contributor of wideband electrical noise is non-periodic spatial noise (pattern) in the photodiode line array 31. Such noise can arise from random diode-to-diode non-equal photosensitivity between photodiodes of the array 31.

The primary output (i.e., the filter output of greatest amplitude) of the Fast Fourier Transform filter bank 40 provides an indication of the frequency location of the de-chirped data within the spectral coverage of the filter bank 40. However, assuming the narrowband filtering results in a sufficiently high signal-to-noise ratio, the outputs of the filter bank 40 can be interpolated to provide a determination of frequency that is finer than the frequency spacings of the filters of the filter bank 40.

The process of determining the filter containing the peak response to the line array readout data is performed by the filter peak selector 41. Peak selection techniques are well known in the art, and the present invention contemplates commutation through the outputs of the filter bank 40 at the end of each data processing cycle to identify that filter providing the output of greatest amplitude.

The filter peak selector 41 can also be adapted to provide an interpolated output showing where the readout de-chirped data burst lies in frequency with respect to the response peaks of two spectrally adjacent filters.

After each filter peak selection/identification process is completed, the data in the Fast Fourier Transform processor 40 is "dumped" in preparation for reception of the next readout data to be processed.

The detailed timing sequence for the Fast Fourier Transform transform analyzer implementation is shown in FIG. 5. As shown, analog-to-digital conversion takes place during the read out interval, such read out interval being illustrated in more detail in FIG. 3 with FM'ed readout clock pulses. Subsequent to the analog-to-digital data conversion process, the Fast Fourier Transform filtering is performed. Following this step in the process, the filter peak selection process is provided by the filter peak selector 41, and an output signal indicative of the data burst frequency is outputted. Such output signal is indicative of the pressure sensed. Finally, the processing interval is completed by dumping all data in preparation for the next processing cycle.

A quantitative example of the operation of the pressure sensing system implemented with a Michelson interferometer (FIG. 1) may be helpful in appreciating its advantages. The previously discussed example of an interferometer differential length of 0.01 inches at atmospheric pressure and a 0.11 inch differential length at 5000 psi is appropriate. Since the illumination is reflected back along both legs of a Michelson interferometer, the effective differential lengths are respectively 0.02 and 0.22 inches. For an optical spectral width from the wideband optical source 20 of 50 nanometers centered at 850 nanometers, (recognizing that the propagation speed of light in the fiber is approximately 0.7 of that in a vacuum), a two-way differential length of 0.02 inches between the legs of the interferometer includes 870.7 cycles at 825 nanometers, and 820.9 cycles at 875 nanometers. If the 50 nanometer spectrum is analyzed, there would appear (870.7−820.9 cycles)=49.8 nulls across the 50 nm spectrum. If the pressure were increased to 5000 psi, the two-way differential length of 0.22 inches includes 9577.5 cycles at 825 nanometers, and 9030.2 cycles at 875 nanometers. Analyzing the 50 nm spectrum would provide 547.3 nulls.

If these 547.3 interferometric nulls corresponding to 5000 psi are read out in 0.1 seconds, the data burst output from the photodiode array would have a nominal frequency of 5473 Hz. If the transducer were at atmospheric pressure, the 49.8 nulls across the spectrum would have a nominal frequency of 498 Hz. However, as mentioned earlier, these nulls are not equally spaced and instead have a chirp-like spacing that can be removed by nonlinearly clocking the photodiode array readout.

After de-chirping, the resulting data burst as read out from the photodiode array has a bandwidth approximately equal to the reciprocal of the readout time. Thus, with a readout interval of 0.1 seconds, the bandwidth of the data burst is approximately 10 Hz. Thus, when 5000 psi pressure is being sensed, the aforementioned nominal readout frequency of 5473 Hz can be resolved to about 10 hertz out of 5473 Hz, i.e., 0.18%. However, if the signal-to-noise ratio of the readout is high, the data can be interpolated to finer accuracy.

Figure 6:
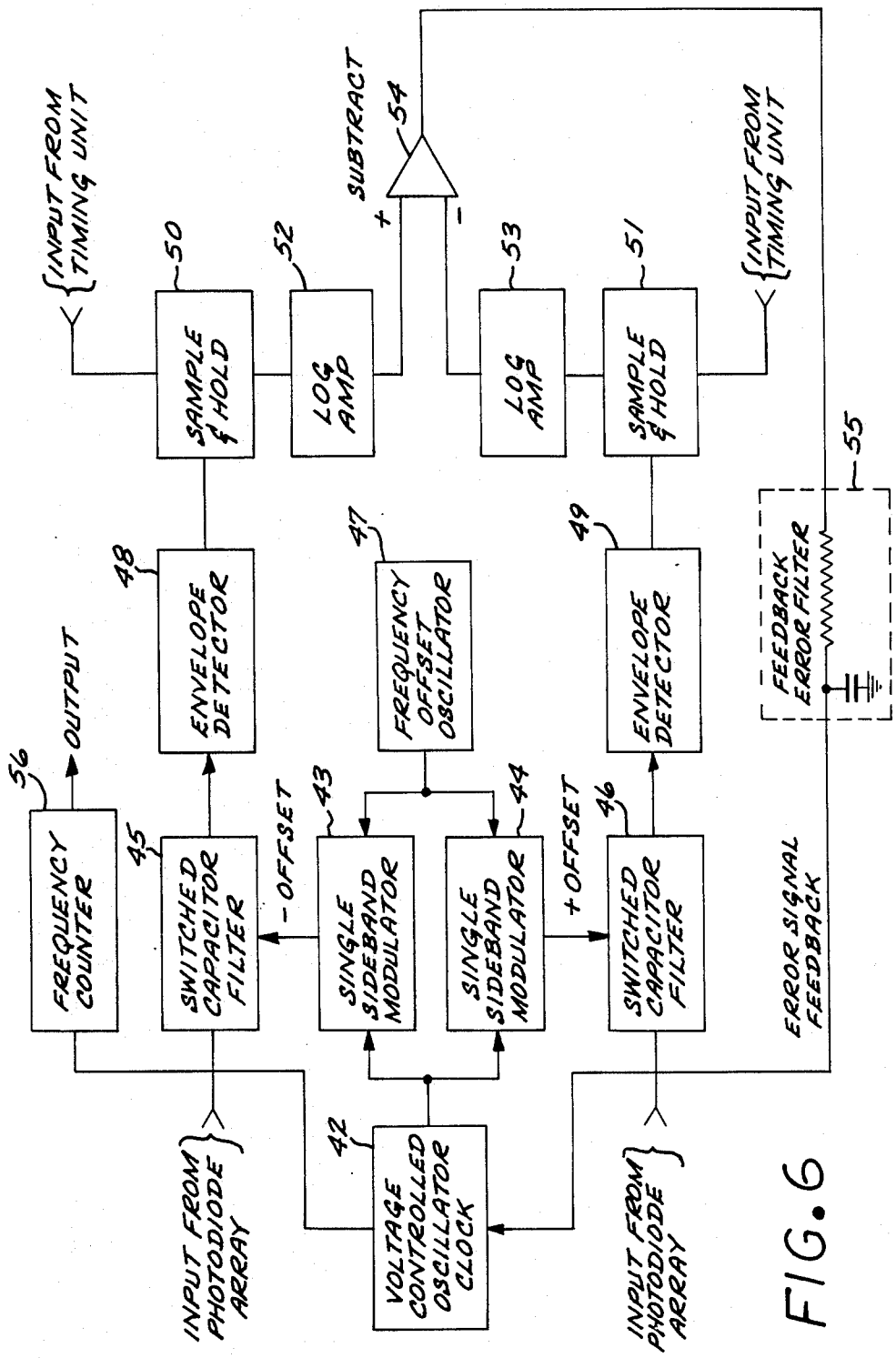

Referring now to FIG. 6, shown therein is a block diagram of an alternative tracking filter analyzer implementation of the signal analyzer 34 (FIGS. 1 and 2). This alternative implementation utilizes tracking filters to perform the narrowband filtering and frequency determination functions. The readout from the photodiode line array 31 is provided in parallel to two switched capacitor filters 45, 46. Switched capacitor filters are known in the art and are available commercially in integrated circuit form. In a narrowband filtering configuration, a switched capacitor filter provides a narrowband frequency response similar to that of a parallel-tuned inductance/capacitor filter. The response frequency of a switched capacitor filter is precisely determined by a clock frequency applied to its clock input, where the clock frequency determines the center frequency of the filter response. Depending on the switched capacitor filter integrated circuit terminal wiring selection, the clock frequency would be a multiple of about 25 to 75 times the peak frequency response of the filter. Thus, variation of the clock frequency provides a mechanism for precisely tuning the response of the switched capacitor filter over a wide frequency range.

Referring again to FIG. 6, the output of a voltage controlled oscillator clock 42 is provided in parallel to two single sideband modulators 43, 44. The output of a frequency offset oscillator 47 is also provided in parallel to the single sideband modulators 43, 44. The frequency of the voltage controlled oscillator 42 is controlled by a feedback loop as described further herein. The outputs of the single sideband modulators 43, 44 are respectively coupled to the clock inputs of the switched capacitor filters 45, 46.

The function of the frequency offset oscillator 47 in conjunction with the single sideband modulators 43, 44 is to provide respective signals that are slightly offset in frequency from the output of the voltage controlled oscillator 42. The frequency offset provided by the single sideband modulator 44 are positive, while the frequency offset of the single sideband modulator 43 is negative. Thus, the switched capacitor filters 45, 46 are tuned at slightly different frequencies, with their response peaks offset by an amount about equal to their −3 dB bandwidths.

The example practical values discussed further herein for the responses of the switched capacitor filters 45, 46 and corresponding voltage controlled and offset oscillator frequencies are based on the following considerations. For example, if the transducer 30 (FIGS. 1) is monitoring 5000 lbs. of pressure, there might be 547.3 cycles across a 50 nanometer spectrum as provided by the wideband optical source 20. If those wideband optical 547.3 interferometric nulls are read out in 0.1 seconds, the de-chirped data burst provided to the switched capacitor filters 45, 46 would be at −5473 Hz. However, if the sensed pressure were, for example, 50 lbs., the two-way differential length would be 0.022 inches, and corresponding de-chirped readout would have a frequency of approximately 547 Hz.

Assuming that the switched capacitor filters 45, 46 are configured so that their frequency response peak is at 1/50 of the clock frequency, the corresponding frequency of the voltage controlled oscillator 42 to respond to 5000 lbs. pressure (a nominal 5,473 Hz readout frequency) would 50 times 5,473, which is equal to 273,650 Hz. To respond to 50 lbs. pressure (a 547 Hz readout frequency), the required frequency of the voltage controlled oscillator 42 would be 27,350 Hz.

In order to symmetrically displace the peak frequency responses of the switched capacitor filters 45, 46 by, for example +5 Hz about the de-chirped photodiode line array readout, the offset oscillator 47 would offset the frequency of the voltage controlled oscillator 42 by about 50× ±5 Hz, i.e., ±250 Hz. in the single sideband modulators 43, 44. This ±250 Hz offset in the clocking rates of the switched capacitor filters 45, 46 will result in the their peak frequency responses to be offset by ±5 Hz around the frequency of the de-chirped data burst readout from the photodiode line array 31.

The two clock inputs to the switched capacitor filters 45, 46 are offset slightly so that, due to closed loop feedback discussed further herein, the response peaks of the switched capacitor filters 45, 46 will symmetrically bracket the frequency of the data burst readout from the photodiode line array 31. When the switched capacitor filters 45, 46 are so tuned, their response amplitudes will be alike. However, if the data burst readout lies closer to the response peak of one of the switched capacitor filters 45, 46, its envelope detected output will be greater. Thus, an error (control) signal can be derived that can serve, in a feedback circuit, to maintain the response of the switched capacitor filters 45, 46 symmetrically around the frequency of the incoming data burst readout from the photodiode line array 31.

The feedback error signal for controlling the voltage controlled oscillator clock 42 is derived as follows. The output of the switched capacitor filter 45 is applied to an envelope detector 48, while the output of the switched capacitor filter 46 is applied to an envelope detector 49. The outputs of the envelope detectors 48, 49 are respectively sampled by sample and hold circuits 50, 51 at the end of each data burst readout at the point in time when the integration process in each of the switched capacitors filters 45, 46 is completed.

It is preferred that, in deriving an optimum feedback error signal, the sampled outputs of the switched capacitor filters 45, 46 should be processed so as to make the derived error signal approximately proportional to the frequency displacement of the filters with respect to the incoming data burst, but at the same time relatively independent of the data burst amplitude. This can be achieved by ratioing the outputs of the sample and hold circuits 50, 51. This is achieved by respectively providing the outputs of the sample-and-hold circuits 50, 51 to logarithmic amplifiers 52, 53, and providing the outputs of the logarithmic amplifiers 52, 53 to a subtraction circuit 54.

The output of the subtraction circuit 54 is a direct function of the error in tuning of the switched capacitor filters 45, 46 with respect to the frequency of the incoming data burst as read out from the photodiode line array 31 (FIGS. 1, 2), where such output is relatively insensitive to data burst amplitude as a result of subtracting logarithms. The output of the subtraction circuit 54 is provided to a smoothing filter 55 which comprises a resistor and capacitor serially connected between the output of the subtraction circuit 54 and ground. The signal at the node between the resistor and the capacitor is the feedback error signal provided to the voltage controlled oscillator clock 42.

In the tracking filter analyzer of FIG. 6, the voltage controlled oscillator clock 42 is feedback controlled so that the switched capacitor filters 45, 46 are tuned by feedback control to symmetrically bracket the frequency of the incoming data burst. The frequency of that voltage controlled oscillator is thus proportional to the pressure being sensed. The frequency of that voltage controlled oscillator 42 is detected by a conventional frequency counter 56 and thereby provides an output that can be translated to pressure.

In summary, the tracking filter analyzer of FIG. 6 performs the following. The frequency of the voltage controlled oscillator is feedback controlled so as to maintain the closely spaced response peaks of a pair of switched capacitor filters symmetrically displaced with respect to the frequency of a de-chirped data burst readout from a photodiode line array. The switched capacitor filters serve to narrowband filter and integrate the data over the duration of the readout data burst, the data thereby improving the signal-to-noise. At the end of each integration interval, the outputs of the filters are sampled. The sampled outputs are compared by taking their ratios, and the resulting ratio is smoothed and applied back to the voltage controlled oscillator, thereby maintaining the response peaks of the switched capacitor filters symmetrically displaced with respect to the frequency of the de-chirped data read out from the photodiode array. The frequency of the voltage controlled oscillator is determined to provide an output indicative of the pressure sensed.

Since the de-chirped frequency burst output of the CCD array may not be coherent from readout to readout, it is necessary to ensure that the tracking filters do not carry over stored energy from one readout to another. This can be accomplished by shorting the inputs to the filters after sampling the envelope detected output of the samplers at the end of each photodiode line array readout.

It should be noted that the closed loop response time of the feedback circuit need only be made fast enough to satisfy the data updating rate requirement of the application. At the same time, higher frequency transients, for example, pressure transients, can be monitored in the feedback loop error channel by picking off an output prior to the smoothing circuits.

The disclosed invention further contemplates a remote transducing system for sensing temperature. Temperature sensing may be required as a sensed output, but it may also be needed to compensate for incidental effects of temperature on the pressure sensing transducer. Such temperature sensing system would be similar to the previously described pressure sensing system, with a different interferometer structure. For the temperature sensing system, both the reference and sensing fiber optic windings optics legs of the interferometer are configured so that neither leg is substantially influenced by pressure. That is, the sensing leg is not increased in length with pressure as in the case of the pressure sensing system. Instead, the temperature sensing winding can be wound around a structure such as a sleeve on a cylinder where the sleeve has a high thermal coefficient of expansion. Alternatively, the temperature sensing leg might be linearly stretched in accordance with temperature, for example, by using a bellows whose length increases with temperature. Here again, as in the pressure sensing interferometer, the sensing leg of the temperature sensing interferometer at minimum temperature will be made slightly longer than the reference leg of the interferometer. Thus, increasing temperature will further increase the differential length. Temperature can be determined by measurement of the differential length of the temperature sensing interferometer as described above relative to the analyzer 40.

The foregoing has been a disclosure of embodiments of a sensing system achieves advantages including the following. No electrical link is required between a remote transducer and the remainder of the system. Instead it utilizes only optical fiber means for relaying the optical spectrum from the source to the transducer, and to relay back to the analyzer the light after being amplitude modulated across the spectrum by the transducer's interferometer. It utilizes only passive elements in a remote transducer, and requires no amplification for relaying the sensed data to the sensor analyzer. Further, the disclosed sensing system does not utilize energy for either the transducer (sensing element) or for data relay from the remote transducer to the sensing system's analyzer. It utilizes long life optical components for sensing and for data relay. Also, the accuracy of the disclosed sensing system should remain high throughout its operating lifetime since the primary parameters that affect the accuracy of the differential length measurement include the center optical wavelength, the span of the optical wavelengths fed to the interferometer, and the yield and hysteresis of the sensor optical fiber and the cylinder upon which the sensor fiber is wound.

Although the foregoing has been a description and illustration of specific embodiments of the invention, various modifications and changes thereto can be made by persons skilled in the art without departing from the scope and spirit of the invention as defined by the following claims.

What is claimed is:

1. An sensing system comprising:
    means for providing optical illumination having a bandwidth of at least 25 nanometers;
    means for transmitting said optical illumination;
    transducer means responsive to said transmitted optical illumination for amplitude modulating said transmitted optical illumination as a function of a monitored physical parameter to provide an amplitude modulated optical illumination having generally sinusoidally varying nulls across the spectrum thereof, the frequency of said nulls varying across the spectrum of said modulated optical illumination and being a function of the monitored physical parameter;
    means for transmitting said modulated optical illumination;
    means for spectrally dispersing said transmitted modulated optical illumination to provide a spectrally dispersed optical signal indicative of the spectral content and amplitudes of said modulated optical illumination;
    means responsive to said spectrally dispersed optical signal for extracting the frequency variation of said periodic nulls to an electrical signal indicative of the substantially constant frequency of said periodic nulls across the spectrum of said modulated optical illumination;
    means for narrowband filtering said electrical signal to provide a filtered signal; and
    means responsive to said filtered signal for providing an output signal indicative to the substantially constant frequency of said periodic nulls.

2. The sensing system of claim 1 wherein said means for narrowband filtering comprises a band of narrowband filters contiguously spaced in frequency response.

3. The sensing system of claim 1 wherein said means for transmitting said optical illumination and said means for transmitting said modulated optical illumination comprise respective fiber optic cables.

4. The sensing system of claim 1 wherein said means for narrowband filtering comprises first and second switched capacitor filters.

5. The sensing system of claim 1 wherein said means for modulating comprises:
    means for splitting said transmitted optical illumination into two channels;
    means for varying the differential length between said two channels as a function of the monitored parameter; and
    means for recombining the optical illumination of said two channels.

6. The sensing system of claim 1 wherein said means for optically spectrally dispersing comprises a diffraction grating.

7. The sensing system of claim 1 wherein said spectrally dispersing means comprises a diffraction grating.

8. The sensing system of claim 4 wherein said means responsive to said filtered signal comprises:
    controlled means for clocking said first and second switched capacitor filters;
    feedback means responsive to the outputs of said first and second switched capacitor filters for controlling said clocking means to provide a clocking frequency indicative of the frequency of said periodic nulls; and
    means for determining the frequency of said controlled clocking means.

9. The sensing system of claim 5 wherein said means for varying the differential length between said two channels comprises first and second optical fibers.

10. The sensing system of claim 9 wherein the length of one of said first and second optical fibers changes in response to changes in the monitored parameter.

11. The sensing system of claim 6 wherein said means responsive to said spectrally dispersed optical signal comprises:
    means for detecting said spectrally dispersed optical signal; and
    means for clocking the readout of said detecting means with a clock signal having a variable frequency.

12. The sensing system of claim 12 wherein said means for detecting comprises a photodiode line array.

13. The sensing system of claim 12 wherein said means for detecting comprises a charge coupled device line array.

14. The sensing system of claim 7 wherein said means responsive to said spectrally dispersed optical signal comprises an optical photodetector line array.

15. The sensing system of claim 14 wherein said optical photodetector line array is a clocked detector line array.

16. The sensing system of claim 15 wherein said means responsive to said spectrally dispersed optical signal further comprises means for clocking said clocked detector line array at variable clock rate to remove the frequency variation of said periodic nulls.

* * * * *